(12) United States Patent
Cha et al.

(10) Patent No.: US 7,558,309 B2
(45) Date of Patent: Jul. 7, 2009

(54) LOW-INTERFERENCE UWB WIRELESS COMMUNICATION SYSTEM AND PROCESSING METHOD THEREOF AND STORAGE MEDIUM RECORDED PROGRAM OF THE SAME

(75) Inventors: Jae-Sang Cha, Seoul (KR);
Chong-Hyun Lee, Seoul (KR);
Kyung-Sup Kwak, Incheon (KR)

(73) Assignee: INHA Industry Partnership Institute, Incheon (KR)

( * ) Notice: Subject to any disclaimer, the term of this patent is extended or adjusted under 35 U.S.C. 154(b) by 541 days.

(21) Appl. No.: 10/547,122

(22) PCT Filed: Apr. 14, 2004

(86) PCT No.: PCT/KR2004/000859

§ 371 (c)(1),
(2), (4) Date: Aug. 26, 2005

(87) PCT Pub. No.: WO2005/099114

PCT Pub. Date: Oct. 20, 2005

(65) Prior Publication Data

US 2006/0088080 A1    Apr. 27, 2006

(30) Foreign Application Priority Data

Apr. 8, 2004    (KR) .................... 10-2004-0023963

(51) Int. Cl.
*H04B 1/00*    (2006.01)

(52) U.S. Cl. ...................................... 375/130; 375/144
(58) Field of Classification Search ................. 375/130, 375/144; 329/313
See application file for complete search history.

(56) References Cited

U.S. PATENT DOCUMENTS

| 2001/0053175 | A1  | 12/2001 | Hoctor et al. |
| 2002/0190786 | A1* | 12/2002 | Yoon et al. ................... 329/313 |
| 2003/0053521 | A1* | 3/2003  | Huang et al. ................. 375/144 |
| 2004/0008617 | A1  | 1/2004  | Dabak et al. |
| 2004/0047285 | A1  | 3/2004  | Foerster et al. |
| 2006/0140249 | A1* | 6/2006  | Kohno ......................... 375/130 |

FOREIGN PATENT DOCUMENTS

EP    1 398 882 A3    3/2004

OTHER PUBLICATIONS

PCT/KR2004/000859 Written Opinion of the International Searching Authority dated Dec. 14, 2004.

* cited by examiner

*Primary Examiner*—David C Payne
*Assistant Examiner*—Tanmay K Shah
(74) *Attorney, Agent, or Firm*—Daly, Crowley, Mofford & Durkee, LLP

(57) ABSTRACT

The proposed invention relates to the interference-free Ultra-Wide Band (UWB) wireless communication system using spreading codes with low correlation duration or Zero Correlation Duration (ZCD) property, the communication processing technique of the system and the record media of the program through the computer.

13 Claims, 8 Drawing Sheets

US 7,558,309 B2

LOW-INTERFERENCE UWB WIRELESS COMMUNICATION SYSTEM AND PROCESSING METHOD THEREOF AND STORAGE MEDIUM RECORDED PROGRAM OF THE SAME

CROSS-REFERENCE TO RELATED APPLICATIONS

This application is a National Stage application under 35 U.S.C. §371 of and claims the benefit of International Application No. PCT/KR2004/000859 filed on Apr. 14, 2004, which claims priority to Korean Application No. 10-2004-0023963, filed on Apr. 8, 2004, which is hereby incorporated by reference.

FIELD OF THE INVENTION

The proposed invention relates to the interference-free Ultra-Wide Band (UWB) wireless communication system using spreading codes with low correlation duration or Zero Correlation Duration (ZCD) property, the communication to processing technique of the system and the record media of the program through the computer.

More specifically, the proposed invention relates to, for constant time period, generating continuous side lobe of auto correlation function or spreading codes with negligibly low or zero cross correlation value for interference cancellation property without complexity of the system and the interference-free Ultra-Wide Band (UWB) wireless communication system using the generated spreading codes with low correlation duration or Zero Correlation Duration (ZCD) property, the communication processing technique of the system and the record media of the program through the computer.

BACKGROUND ART

The Ultra-Wide Band (UWB) wireless communication technique, which is currently rising, is the epochal digital data transmission technique through ultra-wide frequency band using remarkably low power. This Ultra-Wide Band (UWB) wireless communication system is the wireless communication system which is directly transferring using short pulses (width: ns scale) or communicating information, through wideband over 500 MHz, using sinusoidal waves with high frequencies as pulses to carrier waves.

The early system of UWB is mostly the UWB of Time Hopping (TH) methods, which generally used Pulse Position Modulation (PPM) as data modulation method, that modulates temporal position depending on forms of data "1" or "0" when pulse is emanated.

In the case of the UWB with TH method, after data modulation such as PPM, multiplication is able through maintaining orthogonality on the time scale across users by allocated hopping codes of TH for each user.

However, in the UWB system using TH method, Bit Error Rate (BER) performance can only be remained satisfactory under ideal circumstances that only Additive White Gaussian Noise (AWGN) exists, although, under practical Wireless Personal Area Network (WPAN) environments which usually UWB applied to, performance of communication has been degraded by bad receiving performance of data, influenced chronic interference problems such as Multi-Path Interference (MPI) and/or Multiple Access Interference (MAI), and increased hardware loadings to remove those interferences artificially.

SUMMARY OF THE INVENTION

Accordingly, the proposed invention is directed to the Ultra-Wide Band (UWB) wireless communication technique that substantially obviates one or more problems due to limitations and disadvantages of the related art.

An object of the proposed invention is to generate new ternary spreading codes that auto correlation side lobe is zero or auto correlation property between codes for all time period with Zero Correlation Duration property of maximum N−1 chip and to provide the interference-free ultra-wide Band (UWB) wireless communication system using spreading codes with negligibly low or zero cross correlation value for interference cancellation without complexity of the system, the communication processing technique of the system and the record media of the program through the computer.

It is to be understood that both the foregoing general description and the following detailed description of the proposed invention are typically and explanatory and are intended to provide further explanation of the invention as claimed.

BRIEF DESCRIPTION OF THE DRAWINGS

The attaching Figures which are included to provide a further understanding of the invention and to explain the principle of the invention. In the figures.

DETAILED DESCRIPTION OF THE INVENTION

Figure 1:
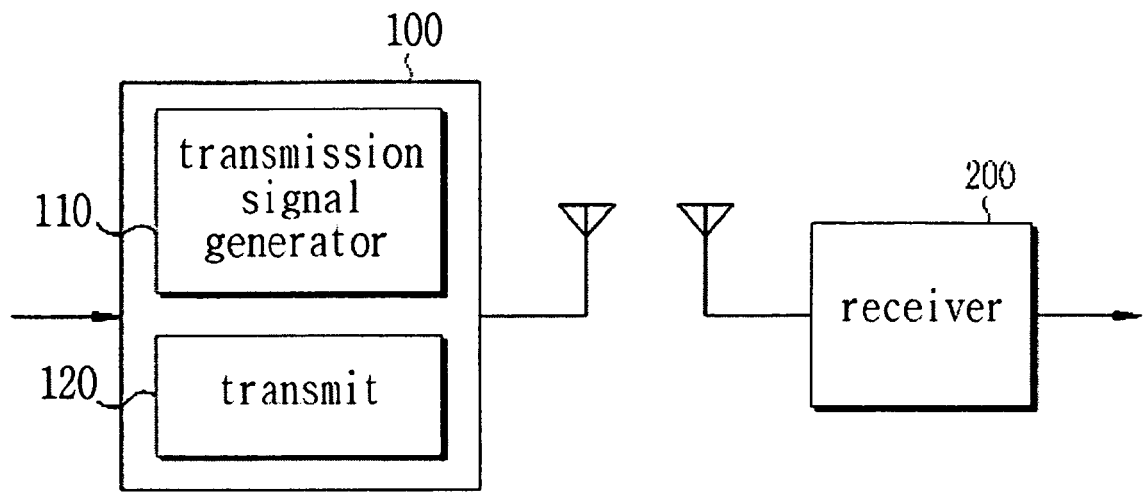
FIG. 1 shows a schematic to explain the interference-free Ultra-Wide Band (UWB) wireless communication system using spreading codes with low correlation duration or Zero Correlation Duration (ZCD) property.

Reference will now be made in detail to examples of which are showed in the attaching figures. Wherever possible, the same reference numbers will be used throughout the figures to refer to the same or like parts.

The first example of the proposed invention to achieve those goals is consisted of transmit signal generating process which an example of this invention consists of following processes to accomplish the purpose mentioned above; in the ultra wide band wireless communication operating system which have negligible low cross-correlation duration of zero-correlation duration spreading codes, for fewer users, modulated data symbol value, spreading codes for fewer users, a transmission signal generating process which generates transmission signals to have lower cross-correlation duration or zero-correlation duration characteristics which make lower or zero cross-correlation value of short signals using bit or chip period; a transmission signal sending process which sends generated transmission signals which is converted from the generated transmission signals to ultra wide band signals by the above-mentioned process; in multiplexing method for transmitting them, a transmission process which transmits the signals applying multi-carrier method or multi-band method which transmits signals using various carriers after dividing the whole UWB frequency band to each channel; a receiving process performing signal processing process by accumulating statistic vectors after receive ultra wide band signals which maintain zero-correlation duration characteristic through multi-path.

Another example of the proposed invention is suggesting a proposal of new conceptual ternary spreading codes and method of generating the codes which are that, for constant time period, side lobe of auto correlation function and cross correlation property has zero cross correlation duration property for maximum N−1 chip duration, that cross correlation side lobe is perfectly zero or cross correlation property between codes is perfectly zero for all time period and that process gain is variable.

Another example of the proposed invention is, for the Ultra-Wide Band wireless communication system with spreading codes of the low correlation duration or zero correlation duration property, consisted of the transmitter and the receiver; the transmitter including transmit signal generator which generates transmit signal with low correlation duration or zero correlation duration property to make cross correlation value of signals low or zero, using modulated data symbol value for users, spreading codes for users, bit period and chip period, and the transmitter to convert generated signal by the generator; the receiver which receive ultra wideband signal maintaining zero correlation duration property through multi-path, calculate statistic vector and process the signal.

Another example of the proposed invention provides the transmit signal generating process, the transmission process, the transmission process and the recode media which is able to be read; the transmit signal generating process which generates transmit signal with negligibly low correlation duration or zero correlation duration property to make cross correlation value of signals low or zero, using modulated data symbol value for users, spreading codes for users, bit period and chip period, and the transmitter to converted generated signal by the generator; the transmission process which converts the generated signal to ultra-wide band signal and transmit; transmission process which transmit signals using multi-band or multi-carrier method that divides the whole UWB frequency band to each channels as multiplication method; the record media which is able to be read through the computer with program which receive ultra wideband signal maintaining zero correlation duration property through multi-path, calculate statistic vector and process the signal.

EXAMPLE 1

FIG. 1 shows a schematic to explain the interference-free Ultra-Wide Band (UWB) wireless communication system using spreading codes with Zero Correlation Duration (ZCD) property according to the proposed invention.

As shown in the attached FIG. 1, the ultra-wide band wireless communication system using the spreading codes with low cross correlation duration or zero cross correlation duration property has the transmitter (100) and the receiver (200). The low cross correlation duration refers to negligibly low cross correlation duration.

The transmitter (100) includes transmit signal generator (110) which generates transmit signal with low correlation duration or zero correlation duration property to make cross correlation value of signals negligibly low or zero, using modulated data symbol value for users, spreading codes for users, bit period and chip period, and the transmit (120) to convert generated signal by the generator to ultra-wide band signal and transmit.

The receiver (200) receives ultra wideband signal maintaining zero correlation duration property through multi-path, calculate statistic vector and process the signal.

The receiver (200) cancel interference signals which are included in Multiple Access Interference (MAI) signal and Multi-Path Interference (MPI) when Multiple Access Interference (MAI) signal and Multi-Path Interference (MPI) exist in duration low cross correlation or zero cross correlation.

The receiver (200) detects received signal through detector after it derives a correlation peak using matched filter with the reference signal for an amount of one period of codes.

In the receiver (200), the statistic vector includes the value of the cross correlation matrix of normalized signature waveform vector.

Bit Error Rate (BER) under Multi user Detection (MUD) condition of the interference-free ultra-wide band wireless communication system, composed of Q function, is according to BER of single User Detection (SUD) system, so it is possible to implement the compact system without MUD. Also, the spreading codes with low cross correlation or zero cross correlation make that interference-free intra-cellular wireless Personal Area Network (WPAN) can be built without Multiple Access Interference (MAI) in the interference-free wireless communication system.

The low cross correlation or zero cross correlation duration length of the interference-free wireless communication system applied the proposed invention is designed to cover the major delay path length of Multi-Path Interference (MPI).

The interference-free wireless communication system operates as Multi-Path Interference (MPI) eliminating system when the major delay path length of Multi-Path Interference (MPI) is 0.5×(zero cross correlation −1), using low cross correlation or zero cross correlation property. The communication processing technique of the interference-free wireless communication system using the spreading codes with the low cross-correlation or zero cross-correlation duration is explained as followed.

Figure 2:
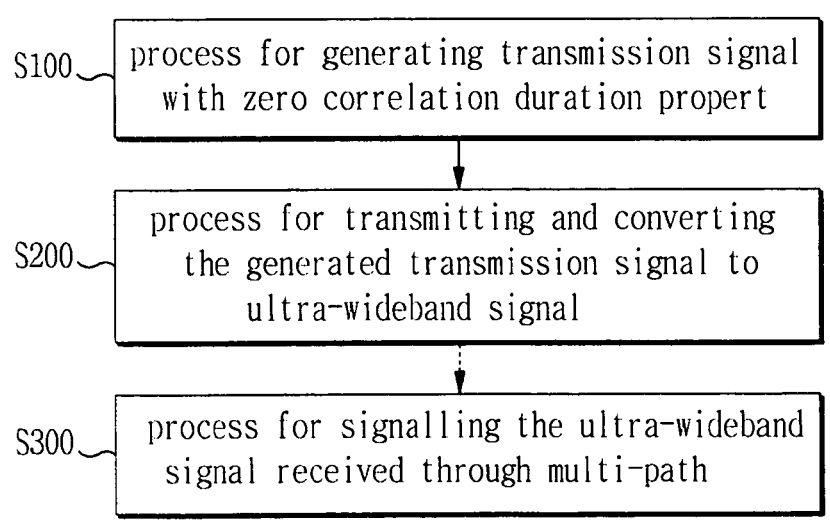
FIG. 2 shows a figure to conceptually explain communication processing method of the proposed invention for the interference-free Ultra-Wide Band (UWB) wireless communication system using the spreading codes with low correlation duration or Zero Correlation Duration (ZCD) property.

FIG. 2 shows a figure to conceptually explain communication processing method of the proposed invention for the interference-free Ultra-Wide Band (UWB) wireless communication system using the spreading codes with low correlation duration or Zero Correlation Duration (ZCD) property.

As shown in the attached FIG. 2, it is composed of the transmit signal generating process (S100) which generates transmit signal with negligibly low correlation duration or zero correlation duration property to make cross correlation value of signals low or zero, using modulated data symbol value for users, spreading codes for users, bit period and chip period, the transmission process (S200) which converts the generated signal to ultra-wide band signal and transmit and the receiving process (S300) which receive ultra wideband signal maintaining low correlation or zero correlation duration property or the signal mixed to sinusoidal waves through multi-path, calculate statistic vector and process the signal.

Those processes are explained as followed.

The proposed invention for the interference-free Ultra-Wide Band (UWB) wireless communication system using the spreading codes with low correlation duration or Zero Correlation Duration (ZCD) property is the ultra-wide Band (UWB) wireless communication system based on Direct Sequence (DS) using the spreading codes with negligibly Low Correlation Duration (LCD) or Zero Correlation Duration (ZCD).

The transmitter (100), which is included in the ultra-wide band wireless communication system using the spreading codes with low cross correlation duration or zero cross correlation duration has antipodal modulation for transmission binary symbol.

The transmitter (100) which is included in the ultra-wide band wireless communication system using the spreading codes with low cross correlation duration or zero cross correlation duration generates (S100) transmit signal ($s^k(t)$) with negligible cross correlation duration or zero cross correlation duration formulated following Eq. (1).

$$S^K(t) = \sum_{I=\infty}^{\infty} \sum_{n=0}^{N_r-1} \sqrt{P_K}\, b_i^k a_n^k z(t - iT_b - nT_c) \quad (1)$$

Where, $N_r$ represents the period of the spreading codes, $b_i^k \in \{\pm 1\}$ represents modulated data symbol for k-th user, $a_n^k \in \{\pm 1\}$ represents the spreading codes for k-th user, $z(t)$ represents transmit pulse wave, Tb represents bit periods and Tc represents chip periods.

The ultra-wide band signal of the ultra-wide band wireless communication system using the spreading codes with low cross correlation duration or zero cross correlation duration is composed of the forms of ultra-wide band pulse or the mixed forms of the ultra-wide band pulse into sinusoidal waves, assuming ultra-wide band pulse (w(t)), ultra-wide band pulse (w(t)) becomes $2^{nd}$ differential Gaussian pulse which express in Eq. (2) since received signal of the receiver includes differential forms of signal.

$$w(t) = \left[1 - 4\pi\left(\frac{t}{T_m}\right)\right]\exp\left[-2\pi\left(\frac{t}{T_m}\right)^2\right] \quad (2)$$

Where, $T_m$ represents pulse periods.

The frequency transformed, by the wide band pulse (w(t)) or the mixed ultra-wide Band pulse to sinusoidal wave, sinusoidal pulse for ultra-wide band is transmitted (S200) to the ultra-wide band wireless communication system using the other spreading codes with low cross correlation duration or zero cross correlation duration.

When the multi-path component reaches to integral multiple times of the minimum path resolution time, the receiver (200) of the ultra-wide band wireless communication system using the other spreading codes with negligible cross correlation duration or zero cross correlation duration receives (S300) this signal, the received signal, assuming the minimum path resolution time Tm (Tm~1/Bs) is formulated Eq. (3) as followed.

$$r(t) = \sum_{l=0}^{L-1} c_l^0 s^0(t - lT_m - \tau^o) + \sum_{k=1}^{K} \sqrt{P_k} \sum_{l=0}^{L-1} c_l^k s^k(t - lT_m - \tau^k) + n(t) \quad (3)$$

Where, L represents the number of the multi-path, $c_j^k$ represents the amplitude of the first path, $n(t) \sim N(0, 1)$ represents Additive white Gaussian Noise (AWGN).

The multi-path delay is notated $\tau^k = q_k T_m$, where $q_k$ represents an integer, which is uniformly distributed for the period [0, NrNc−1], Nr represents the processing gain of the spreading codes and Nc=Tc/Tm. As a result, path delay exists within $0 \leq \tau^k < T_r$, the maximum time delay is Tr. In this case, the receiver (200) uses the code-matched filter to detect the received signal not the pulse-matched filter.

The receiver (200) collects the output from the matched filter using the reference signal amounted to one period of each code of K pieces to the input r(t) for one symbol and calculates the sufficient statistic vector y which is formulated in Eq. (4) as followed.

$$y = RWCb + n \quad (4)$$

Where, R represents the Cross-Correlation Matrix of the Normalized Signature Waveform Vector and is expressed in Eq. (5) as followed.

$$R = \int_0^{T_r} d(t) d^H(t) dt \quad (5)$$

Where, n represents the Gaussian 0-mean K-vector with the covariant matrix, which is equivalent to matrix R, C represents multi-channel matrix of Rayleigh random variables. The matrix C and w can each be expressed as Eq. (6) and Eq. (7) as followed.

$$C = \begin{bmatrix} c^0 & 0 & 0 & \cdots \\ 0 & c^1 & 0 & \cdots \\ 0 & 0 & \ddots & \cdots \\ \cdots & 0 & 0 & c^K \end{bmatrix} \quad (6)$$

$$W = \begin{bmatrix} W^0 & 0 & 0 & \cdots \\ 0 & W^1 & 0 & \cdots \\ 0 & 0 & \ddots & \cdots \\ \cdots & 0 & 0 & W^K \end{bmatrix} \quad (7)$$

The vector d is expressed, $$d(t) = [a_0^T(t) a_1^T(t) a_K^T(t)]^T$$

Where,

여기서, $W^k = \sqrt{p_k} I_L$ 이고, $c_k = [c_o^k c_1^k \ldots c_{L-1}^k]^T$ 이고, $a_k(t) = [a_o^k z(t) a_1^k z(t-T_c) \ldots a_{Nr}^k z(t-(Nr-1)T_0)]^T$ 이다.

The component of the cross-correlation matrix R, which is defined in Eq. (5), can be expressed into Eq. (8) as followed.

$$R_{i \times i} = p_{i \times j} = E\{d(t) d^H(t)\} \quad (8)$$

Where, $\tilde{d}(t)=[p_0^T(t)\ p_1^T(t)\ \ldots\ p_K^T(t)]^T$

The wave form pk(t) is expressed as followed.

$p_k^T(t)=[\tilde{s}_k(t)\ \tilde{s}_k(t-Tc)\tilde{s}_k(t-LTc)]^T$ where, $$\tilde{s}_k(t) = \sum_{n=0}^{N_r-1} a_n^k z(t - nT_c)$$

As shown in Eq. (8), if the negligibly Low Correlation Duration (LCD) or Zero Correlation Duration (ZCD) is maintained, the cross correlation of any signal for LCD or ZCD is negligible or zero.

In case of that Multi Access Interference (MAI) signal and Multi-Path Interference (MPI) signal exist within LCD or ZCD, the interference signal is perfectly removed in the receiver (200) of the proposed invention.

To explain Bit Error Rate (BER) of the proposed invention for the ultra-wide band wireless communication system using the other spreading codes with negligible cross correlation duration or zero cross correlation duration, in single user detection, the BER value of k-th user is formulated in Eq. (9) as followed.

$$Q(x) = \int_x^\infty \frac{1}{\sqrt{2\pi}} e^{-t^2/2} dt \tag{10}$$

Where, Q(x) represents complementary accumulative distribution function of the unit normalized variable, this complementary accumulative distribution function is formulated in Eq. (10) as followed.

$$P^{Fk}(\sigma) = \frac{1}{2}\left(1 - \frac{c_k}{\sqrt{\sigma^2 + \sum_j c_j \rho_{jk}^2}}\right) \tag{11}$$

In the multi-path fading (variable wireless channels with delay profile is considerable and when Rayleigh fading channel is considered), BER is expressed in Eq. (11).

In the proposed invention for the ultra-wide band wireless communication system using the other spreading codes with negligible cross correlation duration or zero cross correlation duration, because the cross correlation is extremely lower or the cross correlation is zero especially when ZCD is applied that is good as for the case of single user, BER (Bit Error Rate) of AWGN (Additive White Gaussian Noise) and BER under multi-path fading (variable fading circumstances are considerable, Rayleigh fading is considered in this case) condition can each be formulated as in Eq. (12), Eq. (13) as followed.

$$P^k(\sigma) = \frac{1}{2} Q\left(\frac{c_k}{\sigma}\right) \tag{12}$$

$$P^{Fk}(\sigma) = \frac{1}{2}\left(1 - \frac{c_k}{\sqrt{\sigma^2 + c_k}}\right) \tag{13}$$

Where, the function Q(x) is the Q function in terms of variable x; the probability of the ultra-wide band wireless communication system, of the proposed invention, using the spreading codes with zero cross correlation duration is always less than the probability of the system using codes with cross correlation.

EXAMPLE 2

When Multi use Detection (MUD) is applied to the ultra-wide band wireless communication system, of the proposed invention, using the spreading codes with zero cross correlation duration, BER of AWGN is formulated in Eq. (14) as followed.

$$P_d^k(\sigma) = \frac{1}{2} Q\left(\frac{c_k}{\sigma}\sqrt{1 - r_k^T R_k^{-1} r_k}\right) \tag{14}$$

Where, $r_k$ represents k-th column of matrix R without diagonal components, $R_k$ represents (KL−1) by (KL−1) matrix that k-th low and column of matrix R are cancelled. By the proposed ZCD property of the system, $r_k^T R^{-1} r_k$ becomes zero, so that BER for the MUD applied ultra-wide band wireless communication system, of the proposed invention, using the spreading codes with zero cross correlation duration is formulated in Eq. (15) as followed.

$$P_d^k(\sigma) = \frac{1}{2} Q\left(\frac{c_k}{\sigma}\right) \tag{15}$$

This error rate and the error rate of the Single User Detection (SUD) system are the same.

Also, when MUD under Multi-Path Fading (variable channels are considerable and Rayleigh Fading channel is considered in this case) channel condition is applied to ultra-wide band wireless communication system, of the proposed invention, using the spreading codes with zero cross correlation, BER of the system is formulated in Eq. (16).

$$P_d^k(\sigma) = \frac{1}{2}\left(1 - \frac{1}{\sqrt{1 - \frac{\sigma^2}{c_k^2}\frac{1}{(1 - r_k^T R_k^{-1} r_k)}}}\right) \tag{16}$$

$$= \frac{1}{2}\left(1 - \frac{c_k}{\sqrt{\sigma^2 + c_k}}\right)$$

Therefore, the BER performance of the system which MUD system is applied to and the BER performance of the Single User Detection (SUD) system are the same.

To compare the MUD applied system to SUD applied the system, the ultra-wide band wireless communication system, of the proposed invention, using the spreading codes with low cross correlation or zero cross correlation duration maintains the same functions as MUD when MUD system is cancelled.

EXAMPLE 3

The case that the ultra-wide band wireless communication system, of the proposed invention, using the spreading codes with zero cross correlation duration is applied to wireless Personal Area Network (WPAN) system with multiple access interference free pico-cell is formulated as followed.

The difference of delay time is occurred for arrived signals to Access Point (AP) within the pico-cell in case of the upper links under MAI condition because this difference of delay time differs to signal delays between mobile stations and access points.

Therefore, the ultra-wide band wireless communication system, of the proposed invention, using the spreading codes with low or zero cross correlation duration supports to built intra-cells without MAI. The MAI cancelled pico-cell is formulated in Eq. (17) as followed.

$$R = \frac{c \cdot \delta}{2} \qquad (17)$$
$$= \left(\frac{c \cdot (ZCD - 1)}{(4 \cdot R_c)}\right)$$
$$= \frac{c \cdot T_p \cdot PF \cdot (ZCD - 1)}{4}$$

Where, R represents the radius of MAI free pico-cell, δ represents the maximum signal delay time of the cell, Rc represents the chip rate, c represents the velocity of light, $T_p$ represents the pulse width, PF represents pulse factor (the number of pulses per unit chip).

EXAMPLE 4

For the ultra-wide band wireless communication system, of the proposed invention, using the spreading codes with low or zero cross correlation duration, by designing the LCD or ZCD length to cover the major delay path length of MPI, MPI-free system can be implemented.

When the major delay path length of MPI exists within 0.5(ZCD−1) or 0.5(LCD−1) duration, in the ultra-wide band wireless communication system, of the proposed invention, using the spreading codes with low or zero cross correlation duration peak bit rate, which is formulated in Eq. (18) as followed, can be estimated.

$$Rb = \frac{Mr \cdot rT \cdot M \cdot B_N}{N_r \cdot T_p \cdot PF} \qquad (18)$$

Where, when the system specification is chosen as shown on the TAB. 1 as followed, peak bit rate can be variously calculated and the velocity of the data transmission varies from 100 Mbps to 700 Mbps even when BPSK modulation, which is quite simple to implement, is chosen.

TABLE 1

|  | System A | System B | System C |
|---|---|---|---|
| Access, Duplex | Multi-band Ternary DS-UWB, TDD | | |
| Given BW(bandwidth) | Low band(3.15 to 5 GHz) + High band(5.825 to 10.6 GHz) [2] | | |
| BW/channel | 500 MHz plus Guard Band/channel | | |
| Data modulation | BPSK | | |
| Error correction coding | No | | |
| Pulse width $T_p$ | 2 nsec | | |
| Rake combining | EGC or MRC | | |
| Network, Cell radius R | Pico-net, within 10 m | | |
| BW number for Ch. $B_N$ | 14 (4 Ch./Low band + 10 Ch./High band) | | |
| Mono pulse type | Gaussian pulse with 2 nsec | | |
| Pulse Factor | 1 | | |
| Chip rate $R_c$ | 500 Mcps | | |
| Spreading sequence | Enhanced Ternary ZCD preferred pair [Appendix] | | |
|  | $N_r = 12$ | $N_r = 32$ | $N_r = 72$ |
|  | ZCD = 11 | ZCD = 31 | ZCD = 71 |
| Receptible Time to the Delay path/cell radius | 10 nsec/1.5 m | 30 nsec/4.5 m | 70 nsec/10.5 m |
| Peak Bit rate $R_b$ | 700 Mbps | 263 Mbps | 117 Mbps |

ZCD: Zero Correlation Duration,
δ: Maximum propagation delay time,
Gc: Guard chip,
M: Family size of sequence,
$T_p$: Pulse width,
PF: Pulse factor, i.e. Pulse number/Chip,
$N_r$: Spreading factor = Sequence period N,
$R_c$: Chip rate,
Mr: Mary-Phase level factor; i.e, Mr of BPSK case = 1,
rT: Time share ratio of TDD, e.g., 0.6,
R: Cell radius,
$R_b$: Peak bit rate,
$B_N$: BW number for channelization.

Figure 3:
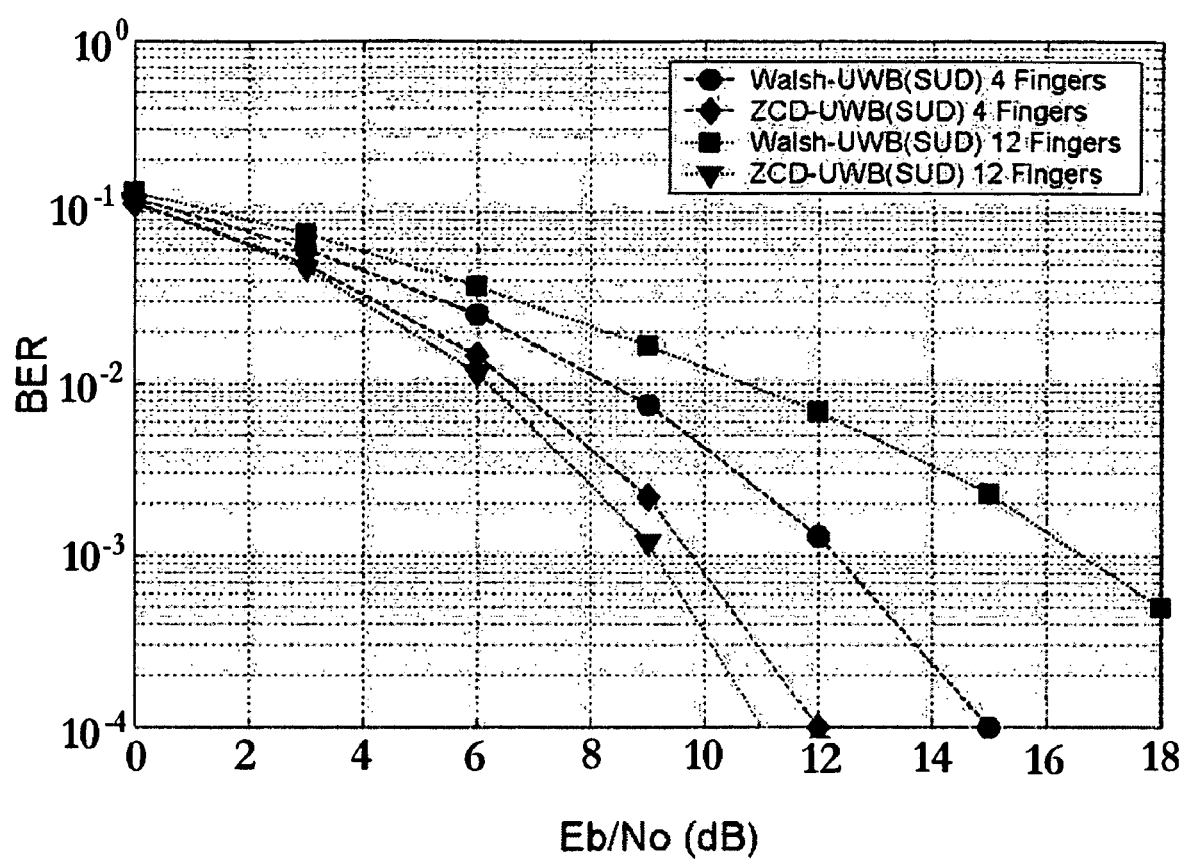
FIG. 3 shows a graph to explain Bit Error Rate (BER) under two users Multiple Access Interference (MAI) and multi-path condition Multiple Access Interference (MAI) environments.

The BER performance of the interference-free ultra-wide band wireless communication system, of the proposed invention, using the spreading codes with zero cross correlation duration can be known from FIGS. 3 and/or 6.

As shown in attached FIG. 3, when the number of path increases with existing MPI, the BER performance of the interference-free ultra-wide band wireless communication system, of the proposed invention, using the spreading codes with zero cross correlation duration exceeds the BER performance of the ultra-wide band wireless communication system based on Walsh-Hadmard codes.

Figure 4:
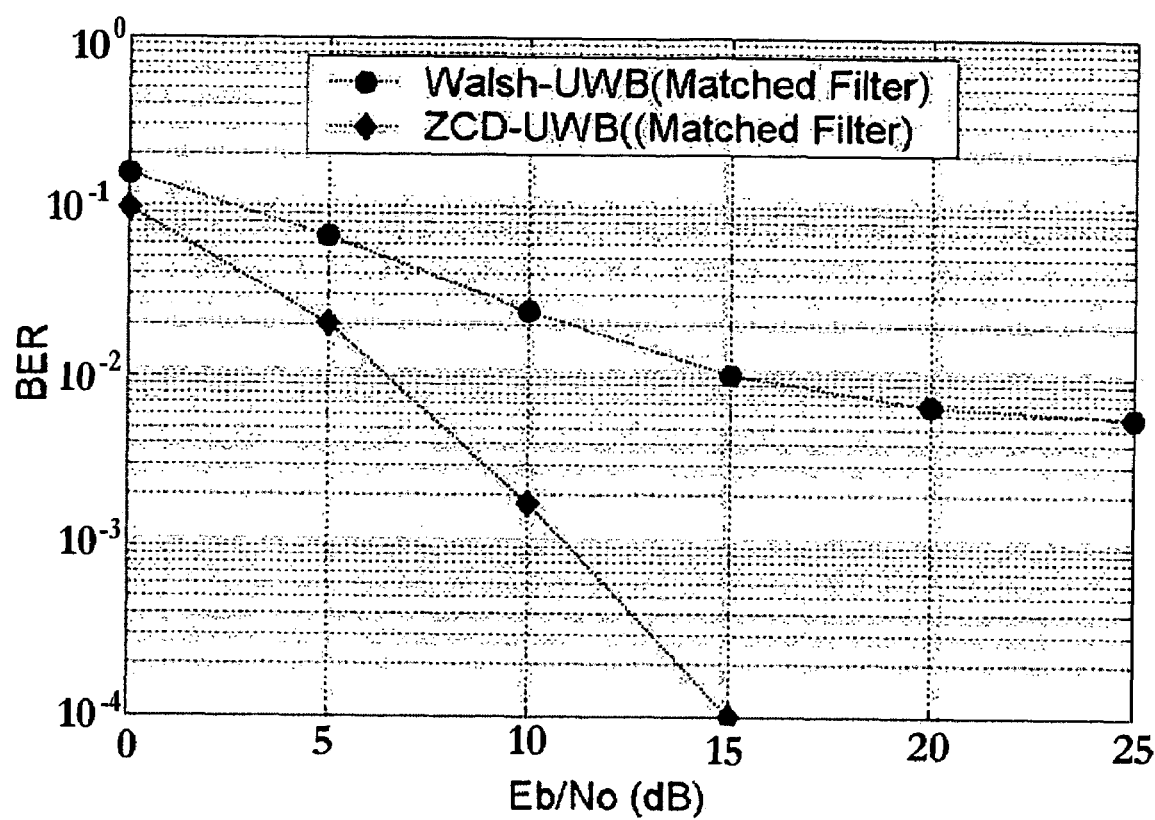
FIG. 4 shows a graph to show the result of Single User Detection (SUD) and Multi User Detection (MUD) under multi-user Multiple Access Interference (MAI) and multi-path Multiple Access Interference (MAI) conditions.

As shown in attached FIG. 4, to compare BER performance under 2-user MAI and MAI of multi-path condition, the interference-free ultra-wide band wireless communication system, of the proposed invention, using the spreading codes with zero cross correlation duration has the better performance than the performance of the ultra-wide band system based on spreading codes which across orthogonally on only one point such as Walsh-Hadamard codes.

Figure 5:
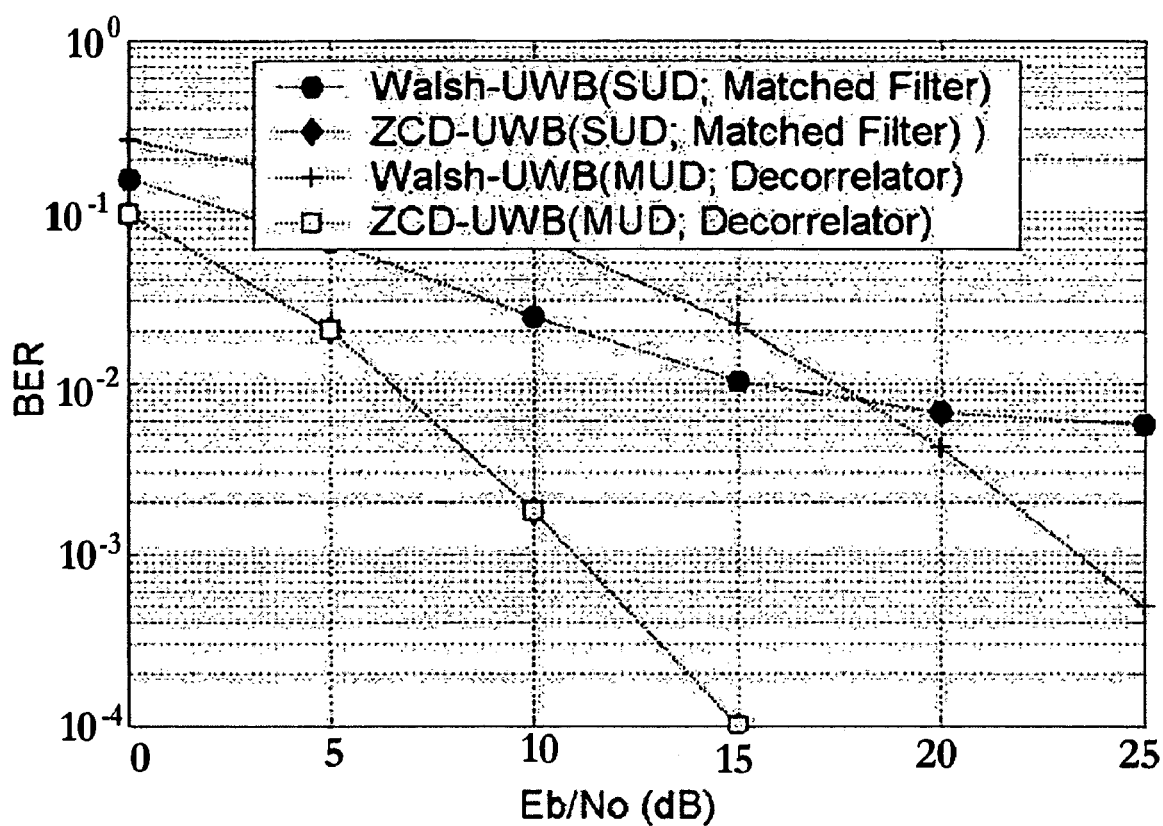
FIG. 5 shows a graph to explain the performance of the interference-free Ultra-Wide Band (UWB) wireless communication system, applied the proposed invention.

As shown in attached FIG. 5, the interference-free ultra-wide band wireless communication system, of the proposed invention, using the spreading codes with zero cross correlation duration, in accordance to the results using SUD and MUD under the multi-user MAI and multi-path MAI conditions has the better performance than the performance of the ultra-wide band wireless communication system and the same BER performances under the both SUD and MUD conditions which represents that the cancellation of the MPI can build the interference-free ultra-wide band wireless communication system, of the proposed invention, using the spreading codes with zero cross correlation duration.

Figure 6:
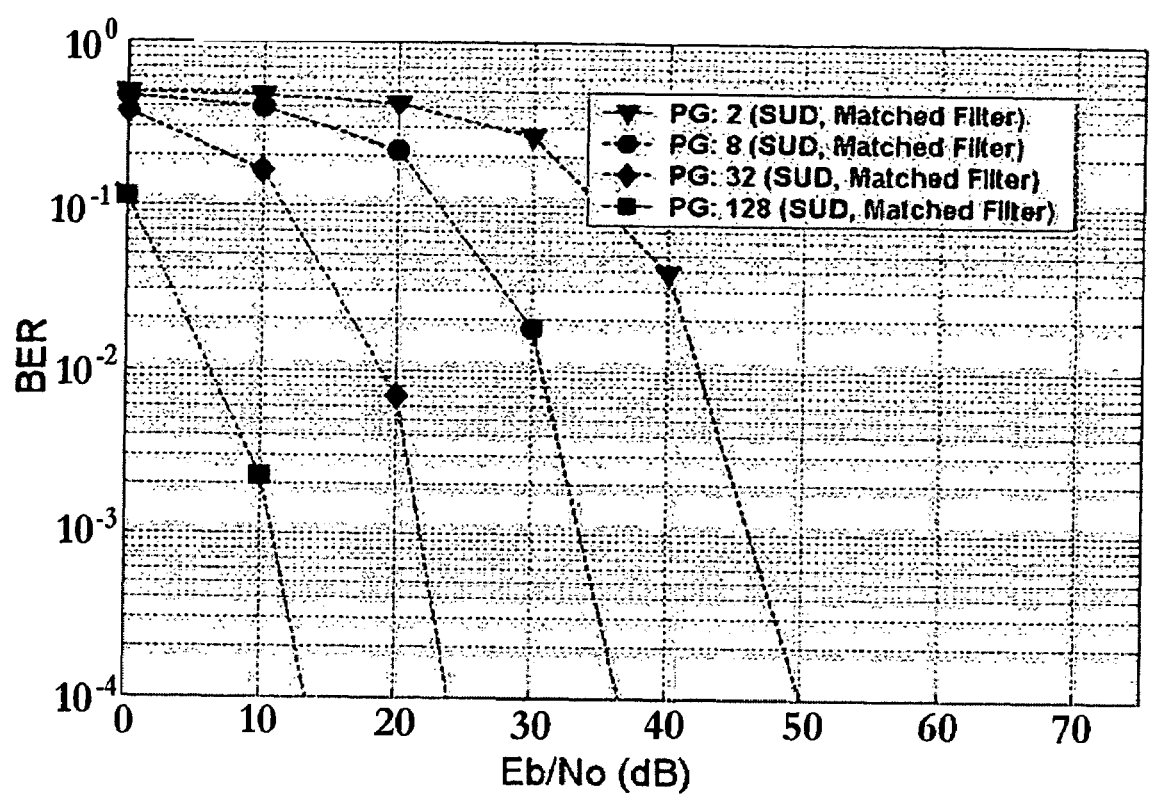
FIG. 6 shows a graph to explain BER performance of the interference-free Ultra-Wide Band (UWB) wireless communication system using zero correlation spreading codes, applied the proposed invention.

The attached FIG. 6 is the comparison of the BER performances of the each system to confirm the meaning of processing gain correction of the correction ternary spreading codes suggested by the proposed invention, after generating ternary codes with variable processing gains and applying to ZCD-UWB system, the ternary codes which correct processing gain is primitive to maintain the performance of the system, according to FIG. 6.

Figure 7:
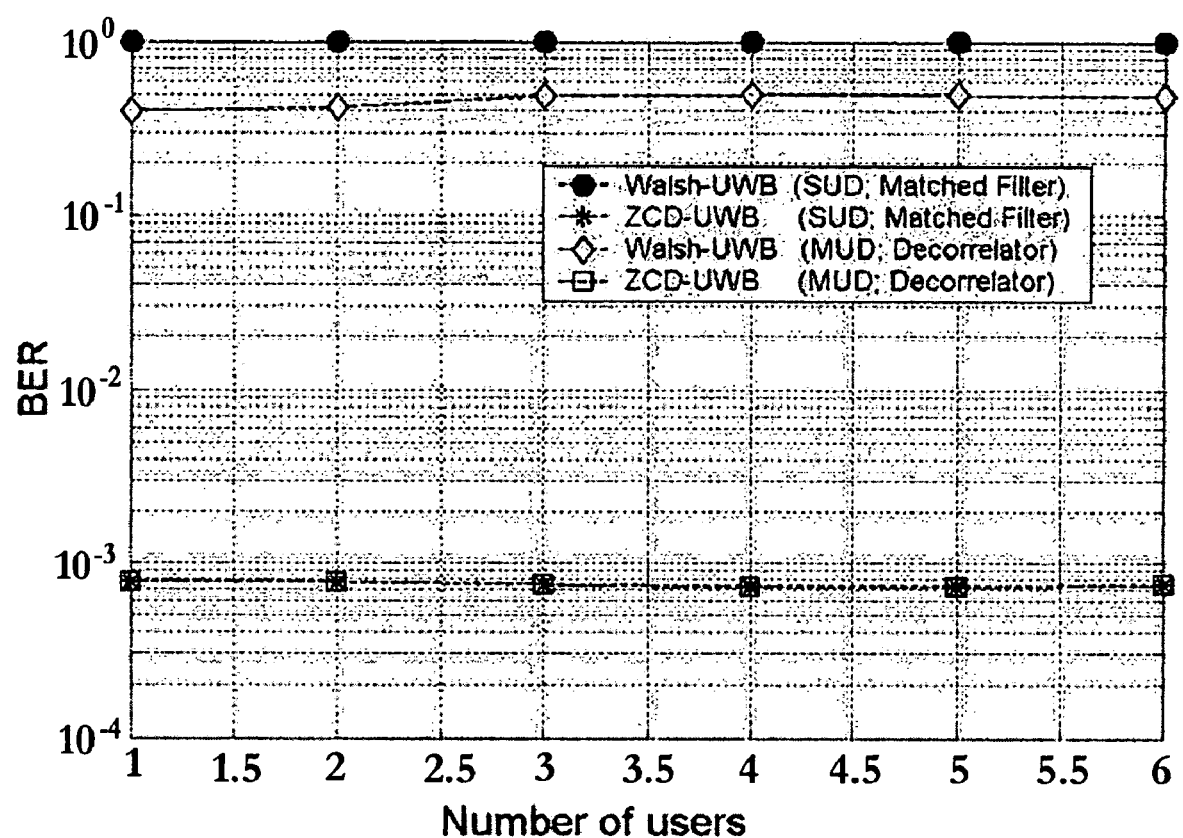
FIG. 7 shows a graph to show BER performance of the system with one ore more users.

FIG. 7 shows a graph of the BER performance analysis with multiple users from one to six to emphasize that ZCD-UWB system of the proposed invention has the more excellent performance than the performance of the existing UWB system of CDMA method based on orthogonally one point-crossing codes such as Walsh-Hadamard codes or OVSF codes.

Figure 8:
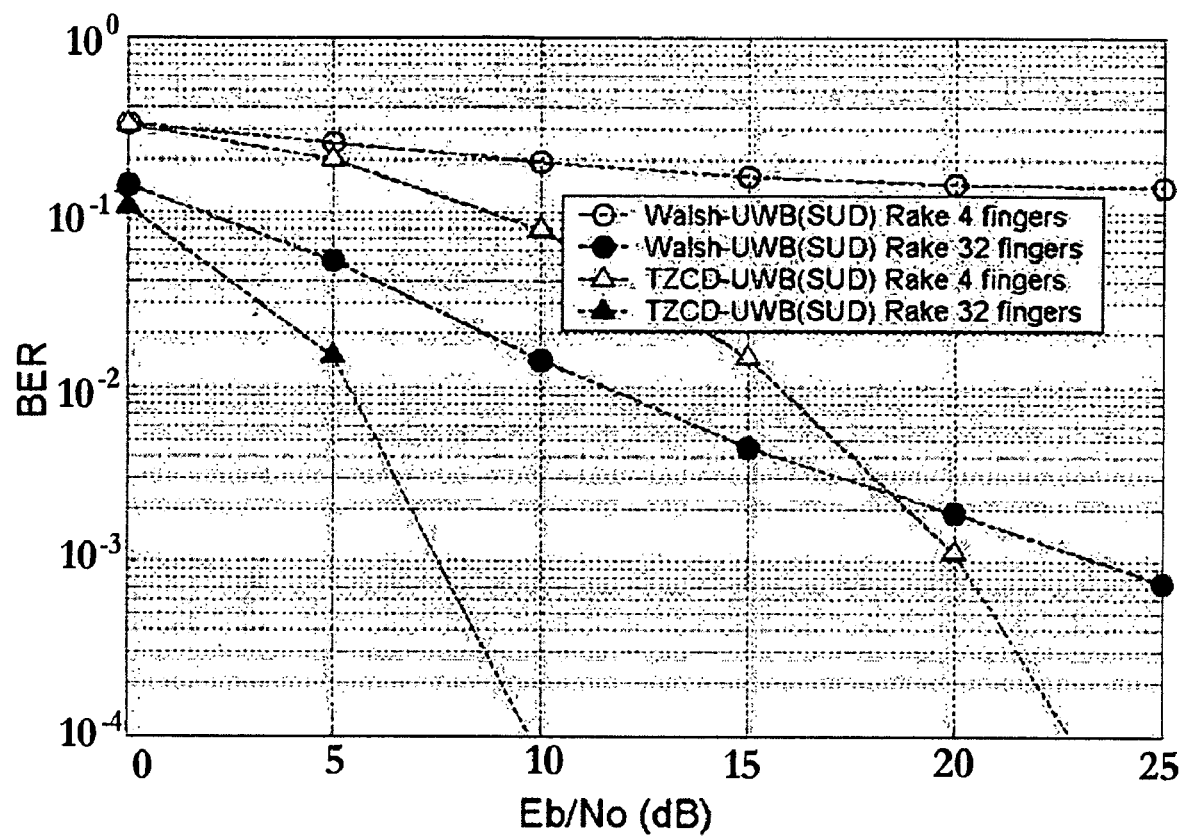
FIG. 8 shows a graph to explain that the ZCD-UWB system, which applied the proposed invention, has the better Bit Error Rate than the existing UWB system based on Walsh codes.

The graph shown in FIG. 8 is emphasizing that ZCD-UWB system of the proposed invention has the remarkable BER performance when multiple numbers of the RAKE finger from 4 to 32 under MAI and MPI occurring constructive condition of the system with two users, than the BER performance of the existing UWB system based on Walsh-Hadamard codes.

Figure 9:
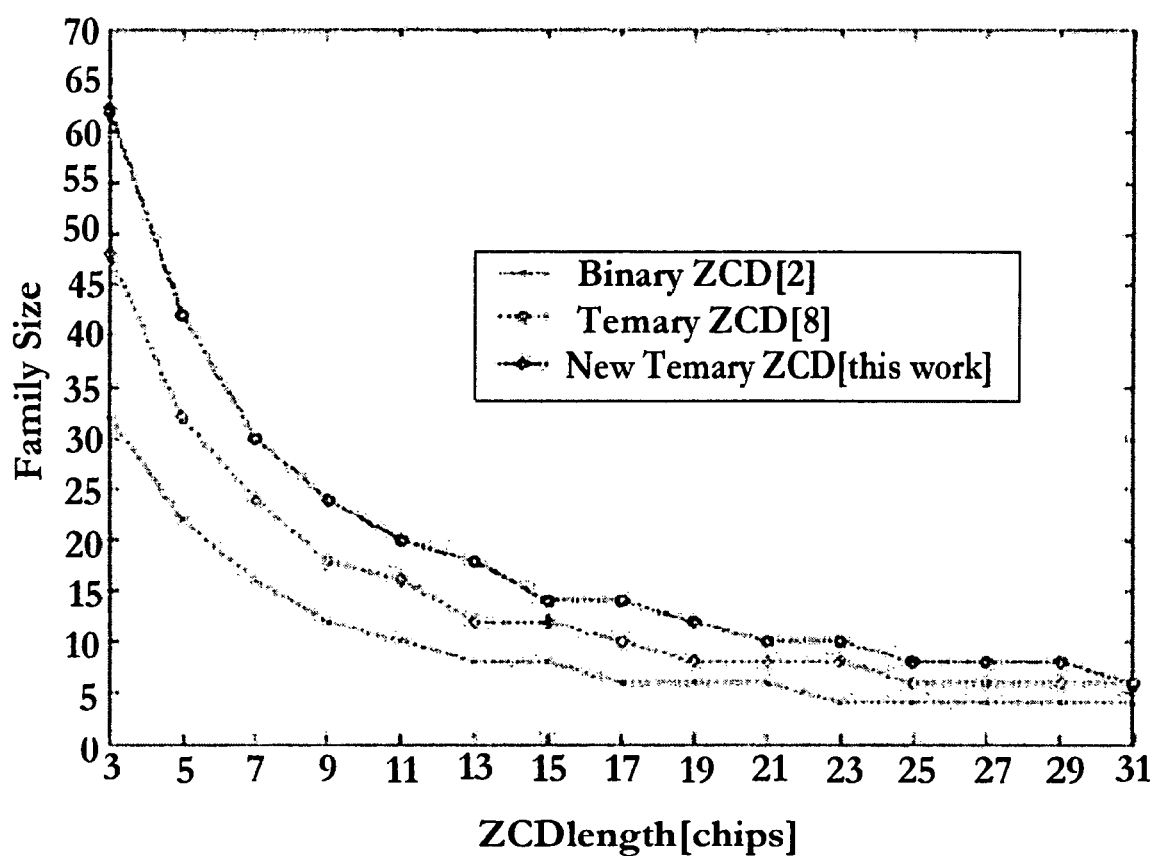
FIG. 9 shows a graph to compare ZCD period versus family size property of ternary codes according to the proposed invention to existing binary and ternary ZCD spreading codes for CDMA systems.

FIG. 9 shows a graph to emphasize that the newly generated ternary codes to verify the enlarged capacity of the corrective ternary codes for processing gain coefficient has the better property of ZCD duration versus family size than the property of the existing binary and ternary codes of CDMA method.

EXAMPLE 5

The generating method of the enhanced spreading codes for ZCD-UWB with the excellent correlation property for ZCD-UWB; when two arbitrary spreading codes with the period N exist, $$S_N^{(x)} = (s_0^{(x)}, \cdots, s_{N-1}^{(x)}) \text{ and } S_N^{(y)} = (s_0^{(y)}, \cdots, s_{N-1}^{(y)})$$

the periodic correlation and the aperiodic correlation function for time shift are given in Eq. (19) and Eq. (20).

$$\text{Periodic } R_{x,y}(\tau) = \sum_{n=0}^{N-1} s_n^{(x)} s_{(n+\tau, \bmod N)}^{(y)} \quad (19)$$

$$\text{Aperiodic } R_{x,y}(\tau) = \sum_{n=0}^{N-\tau-1} s_n^{(x)} s_{(n+\tau)}^{(y)} \quad (20)$$

In accordance to the proposed invention, two types of the newly enhanced ternary ZCD spreading codes are generated. The ternary codes suggested in the proposed invention, using the selected zero padding method to binary seed codes, can develop Ternary Preferred Pairs (TPP) with variable periods of the codes and the maximum ZCD. The specification of the generating method of the aforementioned ternary spreading codes is stated as followed.

To generate the ternary ZCD codes which has the zero first periodic correlation property for all time duration and the periodic and aperiodic correlation property of (N−1) chip-ZCD property, after selective insertion of zeros to the binary codes of Eq. (21) and process gain correction of p, Ternary Preferred Pairs (TPP) $\{A_{N_r}^{(a)}, A_{N_r}^{(b)}\}$ with the $N_r$ period of chip is developed by Eq. (22).

$$\text{Seed set1} = \{(+-), (++), (-+), (--)\} \quad (21)$$

$$A_N^{(a)}, A_N^{(b)} = \pm P_a \times (+Z_i - Z_i), \pm P_a \times (+Z_i + Z_i) \quad (22)$$

Where, $\pm P_a$ means $+P_a$ or $-P_a$, + and − are defined 1 and −1. $Z_i$ represents multiple numbers of zero(0)s, i represents the number of zeros. $P_a$ is the process gain correction coefficient of the ternary spreading codes, suggested in the proposed invention, that process gain is corrected and ranges from 1 to $\sqrt{i+1}$.

For example, when the process gain correction coefficient is $P_a = \sqrt{i+1}$, the proposed process gain of the spreading codes becomes 1 which is the maximum value of the normalization. The cycle of series, for instance, the maximum ZCD duration, which is defined of spreading factor Nr, positive integer, i and $ZCD_{max}$ has the relation as following Eq. (23), Eq. (24).

$$N_r = 2 \cdot (i+1)(i=1,2,3\ldots) \quad (23)$$

$$ZCD_{max} = N_r - 1 = 1 + 2 \cdot i \quad (24)$$

In addition, using $A_N^{(a)}, A_N^{(b)}$, after applying the method to compute the set of the spreading codes maintaining ZCD each other by fixing one code and applying the variable sizes of the ship shift movement of the other code for the constant time, the ternary codes with the various family sizes and the enlarged ZCD duration of the maximum (N−1) chip are generated.

The correlation property of the generated ternary ZCD codes with the ZCD duration of the maximum (N−1) chip can be expressed as followed for the set of the new ternary ZCD codes, periods of various series and properties.

$$\text{Aperiodic } ZCD = \text{Periodic } ZCD = (Nr-1) \text{ chip} \quad (25)$$

$$\text{Periodic } R_{x,y}(\tau) = 0, \forall_\tau \quad (26)$$

TPP $A_4^{(a)}, A_4^{(b)}$ & $A_{10}^{(a)}, A_{10}^{(b)}$ with property of Eq. (25) and Eq. (26) above are stated as followed.

$A_4^{(a)}, A_4^{(b)}$ with process gain 2 is $\{(+z-z),(+z+z)\}$ or $\{(-z+z), (-z-z)\}$, $A_4^{(a)}, A_4^{(b)}$ with process gain 4 is $\{\sqrt{2}\times(+z-z), (+z+z)\}$ ≆ $\{\times\sqrt{2}(-z+z),(-z-z)\}$, $A_{10}^{(a)}, A_{10}^{(b)}$ with process gain 2 is $\{(+zzzz-zzzz), (+zzzz+zzzz)\}$ or $\{(-zzzz+zzzz), (-zzzz-zzzz)\}$ and $A_{10}^{(a)}, A_{10}^{(b)}$ with process gain 10 $\{2\times(+zzzz-zzzz),(+zzzz+zzzz)\}$ is ≆ $\{2\times(-zzzz+zzzz),(-zzzz-zzzz)\}$.

Where, +, z and − are defined 1, 0 and −1.

To generate the ternary ZCD codes that the periodic ACF side lobe is perfectly zero with ZCD of the second (N−1) or (N−3) chip, after selective zero fading process for Eq. (27) which means the different binary seed codes from Eq. (21), TPP $C_N^{(a)}, C_N^{(b)}$ ≆ with the period $Nr=N=2\cdot(i+2)$ of is generated by Eq. (28).

$$\text{Seed set } 2 = \{(+++-), (++-+), (+-++), (-+++) (---+), \\ (--+-), (-+--), (+---)\} \quad (27)$$

$$C_N^{(a)}, C_N^{(b)} = \pm P_c \times (++Z_i \pm Z_i), \pm P_c \times (\pm Z_i ++Z_i) \text{ or} \quad (28)$$
$$\pm P_c \times (++Z_i \mp Z_i), \pm P_c \times (\pm Z_i --Z_i) \text{ or}$$
$$\pm P_c \times (--Z_i \mp Z_i), \pm P_c \times (\mp Z_i --Z_i) \text{ or}$$
$$\pm P_c \times (--Z_i \pm Z_i), \pm P_c \times (\mp Z_i ++Z_i)$$

where, $\pm P_c$ represents $+P_c$ or $-P_c$. $P_c$ is the process gain correction factor and ranges from 1 to $\sqrt{0.5i+1}$. Especially Eq. (28), by applying $P_c = \sqrt{0.5i+1}$ to TPP$\{C_N^{(a)}, C_N^{(b)}\}$, the normalization of the process gain of becomes the maximum value 1. In use of the generated TPP$\{C_N^{(a)}, C_N^{(b)}\}$ with applying chip shift operation, the ternary ZCD code set with various ZCD chip duration and family sizes is composed.

The cross correlation property of the ternary ZCD codes generated as mentioned above, the set of the ternary ZCD codes and the periods of various series are stated as followed.

Aperiodic $ZCD+(N_r-3)$chips  (29)

Periodic $ZCD=(N_r-1)$chips  (30)

Periodic $R_{x,x}(\tau)=0, \tau \neq 0$  (31)

For another example, by equalizing properties of the example of TPP$\{C_{10}^{(a)}, C_{10}^{(b)}\}$, Eq. (27), Eq. (28) and Eq. (29), $\{C_{10}^{(a)}, C_{10}^{(b)}\}$=with process gain 4 is $\{(++zzz+-zzz), (+-zzz++zzz)\}$ or
$\{(++zzz+-zzz), (+-zzz--zzz)\}$ or
$\{(--zzz-+zzz), (-+zzz--zzz)\}$ or
$\{(--zzz+-zzz), (-+zzz++zzz)\}$ or And $\{C_{10}^{(a)}, C_{10}^{(b)}\}$=process gain 10 is as followed.

$\{\sqrt{2.5}\times(++zzz+-zzz), \sqrt{2.5}\times(+-zzz++zzz)\}$ or
$\{\sqrt{2.5}\times(++zzz-+zzz), \sqrt{2.5}\times(+-zzz--zzz)\}$ or
$\{\sqrt{2.5}\times(--zzz-+zzz), \sqrt{2.5}\times(-+zzz--zzz)\}$ or
$\{\sqrt{2.5}\times(--zzz+-zzz), \sqrt{2.5}\times(-+zzz++zzz)\}$ To compare the family size property for ZCD durations of the existing ternary ZCD with 128 period to the family size property for ZCD durations of the generated ZCD codes by the proposed invention, as shown in attached FIG. 9, the family size of the generated ternary ZCD codes by the proposed invention has been enlarged than the family size of the existing binary or ternary codes.

It is to be understood that the proposed invention is not limited to the above-mentioned examples but can be alternated and modulated by makers concerned and is included in the objective of the proposed invention, which is stated in the following claims.

As mentioned before, the ultra-wide band wireless communication system using the spreading codes with zero cross correlation duration, which is implemented by the proposed invention, is effective to have interference cancellation characteristics without any complexity of the system by generating the spreading codes which become zero for the constant time.

Moreover, the proposed invention successfully provides the excellent noise-free sensitivity with reduced Bit Error Rate by combining the newly invented spreading code corrective ternary spreading sequence with the aperiodic Zero Correlation Duration (ZCD) property, the Direct Sequence-Ultra Wide Band (DS-UWB) and the spreading codes with negligibly low or zero correlation duration.

The proposed invention is also compatible with MUD system under MAI and MPI conditions.

What is claimed is:

1. The application method of the ultra-wide band wireless communication system using the spreading codes with zero cross correlation duration, the application method comprising steps of:
   the transmission signal generating process which generates transmission signal with zero correlation duration property to make cross correlation value of signals low or zero, using modulated data symbol value for users, spreading codes for users, bit period and chip period;
   the transmission process, which converts the generated signal to ultra-wide band signal and transmit;
   the transmission process, which transmits signals using Multi-band or Multi-Carrier method that divides the whole UWB frequency band to each channels as multiplication technique;
   the receiving process, which receives ultra wideband signal maintaining zero correlation duration property through multi-path calculate statistic vector and process the signal;
   wherein the length of the zero cross correlation duration is designed to cover the delay path length of the Multi-Path Interference (MPI),
   wherein the interference-free ultra-wide band wireless communication system further comprise the cancellation process of MPI signal using the property of zero cross correlation, when the major delay path length of the Multi-Path Interference (MPI) is 0.5×(the zero cross correlation −1).

2. The application method according to claim 1, wherein the spreading codes is characteristic of the zero cross correlation property of the maximum N−1 chip is zero, that the cross correlation properties between codes are perfectly zero for all the time or that the process gain of the ternary spreading codes is variable.

3. The application method according to claim 1, wherein receiving process further comprise the process of cancellation of interference signals which is inclusive in Multiple Access Interference (MAI) signal and Multi-Path Interference (MPI) signal when MAI and MPI are existing within zero cross correlation duration.

4. The application method according to claim 1, wherein The receiving process detects received signal using the matched filter with the reference signal for an amount of 1 period of code.

5. The application method according to claim 1, wherein statistic vector in the receiving process comprise the value of the cross correlation matrix of normalized signature waveform vector.

6. The application method according to claim 1, wherein The Bit Error Rate (BER) in the generating process of the transmission signal is composed of Q function, accord to BER of the single user detection system.

7. The application method according to claim 1, wherein The spreading codes with zero cross correlation duration property makes the possible that the interference-free ultra-wide band wireless communication builds WPAN based on intra cell or wireless home network systems without Multiple Access Interference (MAI) by the interference-free ultra-wide band wireless communication.

8. The interference-free ultra-wide band wireless communication system using the spreading codes with zero cross correlation duration, the system comprising:
   The transmitter including transmission signal generator which generates transmission signal with correlation duration property to make cross correlation value of signals zero, using modulated data symbol value for users, spreading codes for users, bit period and chip period, and the transmitter to convert generated signal by the generator;
   the receiver, which receives ultra-wide band signal maintaining zero correlation duration property through multi-path, calculate statistic vector and process the signal;
   wherein the length of the zero cross correlation duration in the interference-free ultra-wide band wireless communication system is designed to cover the delay path length of the multi-path interference (MPI),
   wherein the interference-free ultra-wide band wireless communication system operates the cancellation system of MPI signal using the property of zero cross correlation, when the major delay path length of the multi-path interference (MPI) is 0.5×(the zero cross correlation −1).

9. The system according to claim 8, wherein the receiver cancels interference signals which is included in Multiple Access Interference (MAI) and Multi-Path Interference (MPI) when MAI and MPI signals exist within zero cross correlation duration.

10. The system according to claim 8, wherein The receiver detects received signal using the matched filter with the reference signal for an amount of 1 period of code.

11. The system according to claim 8, wherein The statistic vector comprise the value of the cross correlation matrix of normalized signature waveform vector.

12. The system according to claim 8, wherein The Bit Error Rate (BER) of the interference-free ultra-wide band wireless communication system is composed of Q function, accorded to BER of the single user detection system.

13. The system according to claim 8, wherein the spreading codes with zero cross correlation duration property makes possible that the interference-free Ultra-Wide Band wireless communication system constructs WPAN based on intra cell without Multiple Access Interference (MAI).

* * * * *